United States Patent
Vick, Jr. et al.

(10) Patent No.: US 8,342,247 B2
(45) Date of Patent: Jan. 1, 2013

(54) SAFETY VALVE HAVING MONO SPRING CLOSURE MECHANISM

(75) Inventors: James D. Vick, Jr., Dallas, TX (US); Jimmie R. Williamson, Carrollton, TX (US); Leo G. Collins, Farmers Branch, TX (US); Glenn R. Davis, Euless, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1428 days.

(21) Appl. No.: 11/409,518

(22) Filed: Apr. 21, 2006

(65) Prior Publication Data

US 2007/0246218 A1    Oct. 25, 2007

(51) Int. Cl.
  *E21B 34/08*    (2006.01)
  *F16K 17/00*    (2006.01)
(52) U.S. Cl. ..................... 166/332.8; 137/527
(58) Field of Classification Search ............... 166/332.8, 166/332.1, 319, 321; 137/315.16, 527
See application file for complete search history.

(56) References Cited

U.S. PATENT DOCUMENTS

| | | | |
|---|---|---|---|
| 2,064,247 A | 4/1934 | Evans | |
| 2,711,755 A | 6/1955 | Owen | |
| 2,780,290 A | 2/1957 | Natho | |
| 3,356,145 A | 12/1967 | Fredd | |
| 3,602,205 A | 8/1971 | Turkish | |
| 4,977,957 A | 12/1990 | Pringle | |
| 5,137,090 A | 8/1992 | Hare | |
| 5,159,981 A | 11/1992 | Le | |
| 6,050,294 A | 4/2000 | Makowan | |
| 6,227,299 B1* | 5/2001 | Dennistoun | 166/332.8 |
| 6,394,187 B1* | 5/2002 | Dickson et al. | 166/383 |
| 7,021,386 B2 | 4/2006 | Vick | |
| 2003/0079880 A1 | 5/2003 | Deaton et al. | |
| 2003/0121665 A1 | 7/2003 | Trott et al. | |
| 2003/0178199 A1 | 9/2003 | Deaton et al. | |
| 2005/0039922 A1* | 2/2005 | Vick et al. | 166/332.8 |
| 2006/0118307 A1 | 6/2006 | Williamson | |

FOREIGN PATENT DOCUMENTS

| | | |
|---|---|---|
| CH | 190793 | 5/1937 |
| GB | 2405165 | 2/2005 |

OTHER PUBLICATIONS

Search Report for European Application No. 07251663.6.
Examination Report issued Apr. 6, 2009, for European Patent Application Serial No. 07251663.6, 4 pages.

* cited by examiner

*Primary Examiner* — Shane Bomar
(74) *Attorney, Agent, or Firm* — Smith IP Services, P.C.

(57) ABSTRACT

A safety valve having a mono spring closure mechanism. The closure mechanism may be free of any spiral wound spring. The closure mechanism may include a spring having a beam which bends along its length to apply a biasing force to the closure member at its fully closed position and at its fully open position. The closure mechanism may include only a single spring, with the spring having at least two legs, the legs being joined to each other at an end of each leg, and each leg including at least one beam.

22 Claims, 5 Drawing Sheets

SAFETY VALVE HAVING MONO SPRING CLOSURE MECHANISM

BACKGROUND

The present invention relates generally to equipment utilized and operations performed in conjunction with subterranean wells and, in an embodiment described herein, more particularly provides a safety valve having a mono spring closure mechanism.

It is desirable to provide a safety valve which has an increased inner diameter/outer diameter ratio. This is due to the restricted confines of a wellbore and the desire to have a large flow area for production of fluids from the wellbore. For these reasons it is also desirable to provide a safety valve closure mechanism which can be accommodated in a reduced thickness sidewall area, while still enabling the safety valve to be effectively and reliably closed when necessary.

In the past, safety valve designers have tried using multiple springs in closure mechanisms, in order to provide sufficient force to operate the closure mechanisms in reduced thickness sidewalls. Some of these designs have been successful. However, the use of multiple springs increases the complexity of a closure mechanism while reducing reliability (due to multiple moving elements, increased possibility that debris could impair operation of one of the elements, etc.) and increasing the cost of the closure mechanism.

Therefore, it may be seen that improvements are needed in the art of safety valve closure mechanisms. It is among the objects of the present invention to provide such improvements.

SUMMARY

In carrying out the principles of the present invention, a safety valve is provided with a closure mechanism which solves at least one problem in the art. One example is described below in which the closure mechanism is able to fit into a reduced thickness sidewall of the safety valve. Another example is described below in which a single spring is used to close the closure mechanism.

In one aspect of the invention, a safety valve is provided which includes a closure mechanism with no spiral wound springs. Preferably only a single spring is used which includes beam legs to bias a closure member toward its closed position.

In another aspect of the invention, a safety valve is provided with a closure mechanism including a spring having a beam which bends along its length to bias a closure member toward a fully closed position in which flow through a passage of the safety valve is prevented. The beam applies a biasing force to the closure member at the fully closed position and at a fully open position of the closure member in which maximum flow through the passage is permitted.

In yet another aspect of the invention, a safety valve is provided with a closure mechanism including only a single spring. The spring has at least two legs, with the legs being joined to each other at an end of each leg. Each leg includes at least one beam.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
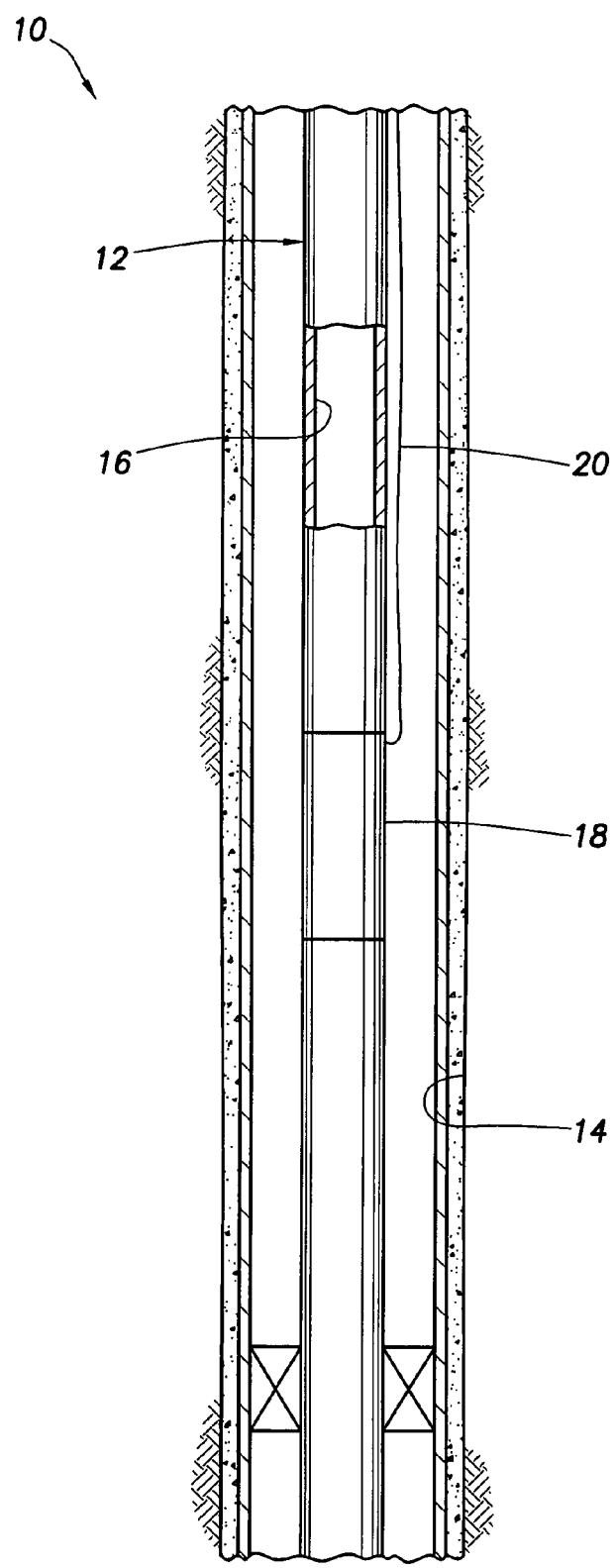
FIG. 1 is a partially cross-sectional schematic elevational view of a well system embodying principles of the present invention.

Representatively illustrated in FIG. 1 is a well system 10 which embodies principles of the present invention. A tubular string 12 (such as a production tubing string) has been installed in a wellbore 14. The tubular string 12 has a flow passage 16 extending longitudinally through it for production of fluids from the wellbore 14.

A safety valve 18 is interconnected in the tubular string 12 for control of the flow of fluids through the passage 16. In particular, the safety valve 18 operates to prevent uncontrolled flow of fluids through the passage 16, for example, to prevent a blowout. The safety valve 18 may be operated for other purposes, as well.

A control line 20 is used to operate the safety valve 18. Typically, the control line 20 is a hydraulic control line, but other types of control lines (such as optical, electrical, etc.) may be used, depending upon the type of actuator with which the safety valve 18 is equipped. Of course, the control line 20 is not always necessary, since the safety valve 18 could instead be operated via any type of telemetry (such as electromagnetic, acoustic, pressure pulse, etc.).

It should be clearly understood that the principles of the invention are not limited in any way to the details of the well system 10 described above. Instead, the well system 10 is merely one example of an application of the principles of the invention. Other types of well systems, and other types of safety valves, may be used without departing from the principles of the invention.

Figure 2:
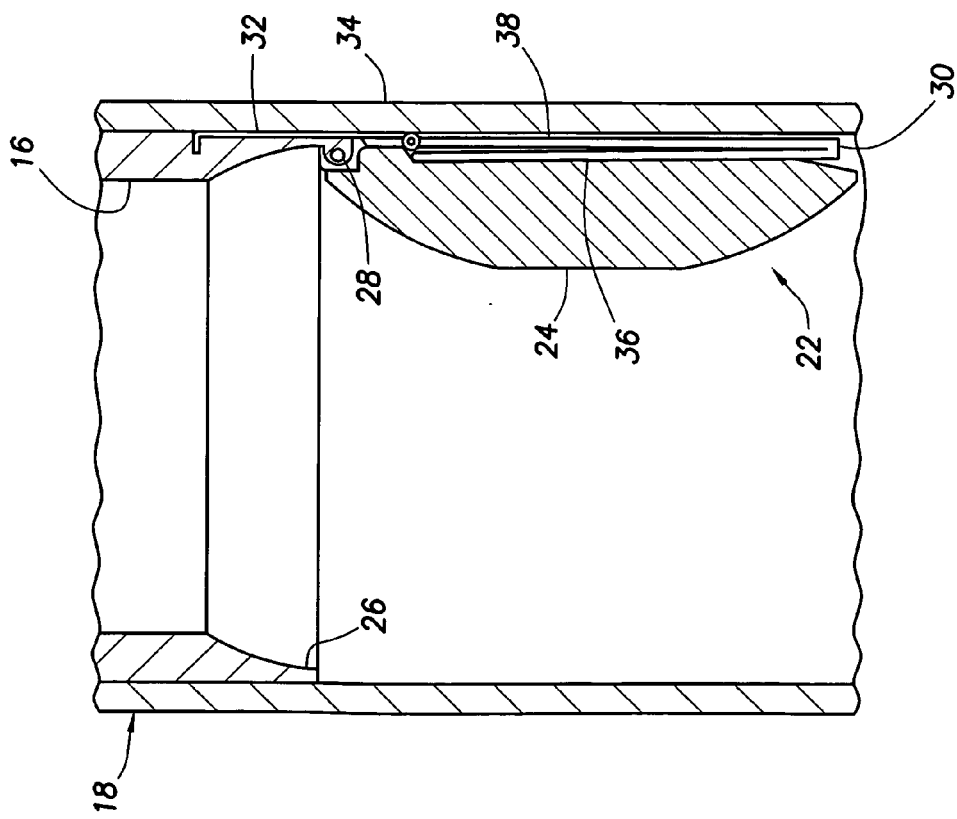
FIG. 2 is an enlarged scale cross-sectional view through a portion of a safety valve in the well system of FIG. 1, wherein a closure mechanism of the safety valve is depicted in a fully open configuration.

Referring additionally now to FIG. 2, a closure mechanism 22 of the safety valve 18 is representatively illustrated in cross-section. The closure mechanism 22 includes a flapper closure member 24 and a seat 26. The flow passage 16 extends through the seat 26 and, with the closure member 24 in the position depicted in FIG. 2, flow through the closure mechanism 22 is permitted.

In this open configuration of the closure mechanism 22, a conventional flow tube, opening prong (not shown) or other device would maintain the closure member 24 rotated downward about a pivot 28. In this manner, the closure member 24 is maintained in a sidewall area of the safety valve 18.

It will be appreciated that space is limited in the sidewall area of the safety valve 18, and so the mechanism for pivoting the closure member 24 about the pivot 28 should be relatively small in size, while still being able to exert sufficient force to effectively close off flow through the passage 16 (by engaging the closure member with the seat 26). Furthermore, the pivoting mechanism should be reliable in operation and, therefore, should preferably have a minimum number of moving elements.

In the embodiment depicted in FIG. 2, the closure mechanism 22 includes a spring 30 positioned between the closure member 24 and an outer housing 34 of the safety valve 18. The spring 30 has two longitudinally extending inner and outer legs or beams 36, 38 joined to each other at one end.

The other end of the outer beam 38 is secured in place relative to the outer housing 34 by an anchor device 32. In this example, the anchor device 32 is a formed wire which is inserted at one end into a recess on an exterior of the seat 26. The other end of the anchor device 32 is wrapped about the upper end of the outer beam 38, thereby securing the upper end of the beam to the seat 26.

The upper end of the inner beam 36 is in contact with the closure member 24 and exerts a biasing force against the closure member. This biasing force tends to rotate the closure member 24 upward (or clockwise as viewed in FIG. 2) about the pivot 28 and toward the seat 26.

The flow tube or opening prong discussed above is used to counteract this biasing force and maintain the closure member 24 in its downwardly pivoted position as shown in FIG. 2. This is the fully open position of the closure member 24, in which maximum flow through the passage 16 is permitted.

Although as depicted in FIG. 2 each of the beams 36, 38 appears to be relatively straight, the beams only have this shape due to their being compressed between the closure member 24 and the outer housing 34. When they are free of this compression, the beams 36, 38 assume a curved shape described more fully below.

Figure 3:
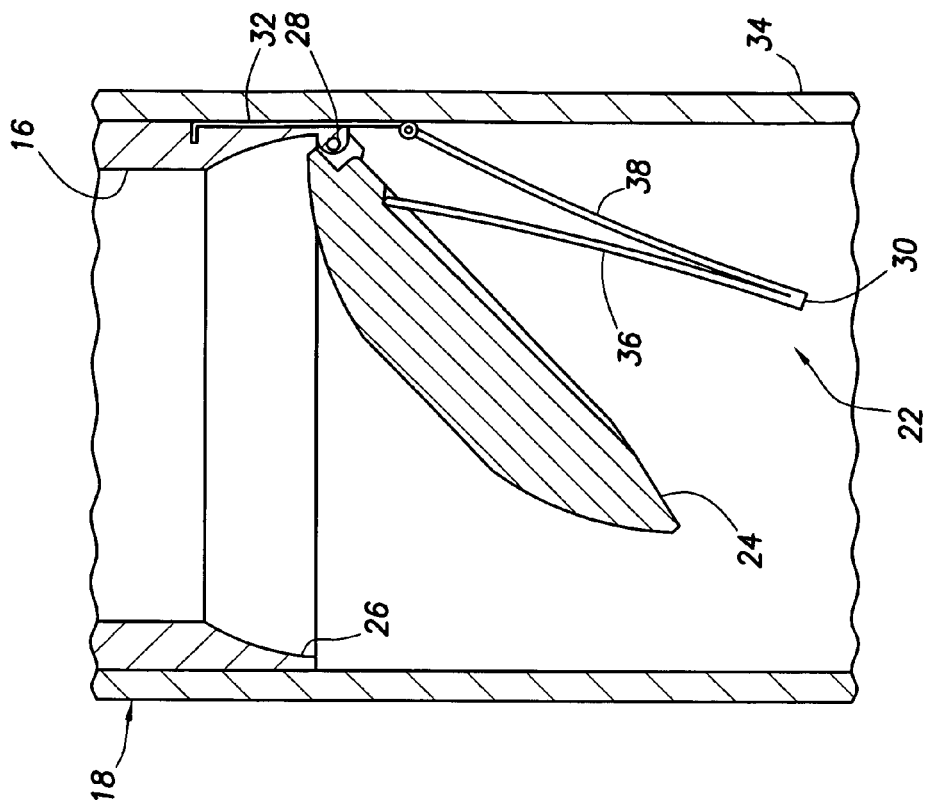
FIG. 3 is a cross-sectional view of the portion of the safety valve of FIG. 2, wherein the closure mechanism is depicted in a partially open configuration.

Referring additionally now to FIG. 3, the closure mechanism 22 is representatively illustrated in a partially open (or partially closed) configuration. In this configuration, the flow tube or opening prong discussed above permits some upward rotation of the closure member 24 about the pivot 28.

Note that the upper ends of the beams 36, 38 have now spread apart due to the rotation of the closure member 24. It will be appreciated that, since the point of contact between the upper end of the inner beam 36 has now displaced inward relative to the pivot 28, somewhat less torque or moment is applied to the closure member 24 by the spring 30 as compared to the open configuration of FIG. 2.

Thus, greater torque is applied to the closure member 24 when rotation of the closure member about the pivot 28 is initiated, and the torque decreases as the closure member pivots upward toward the seat 26. This is a desirable feature of the closure mechanism 22, since greater torque is typically needed to initiate rotation, as compared to the torque needed to maintain the rotation after it has been initiated.

Note that the spring 30 rotates as the closure member 24 rotates. This may be seen by comparing FIGS. 2 & 3 and observing that the joined lower ends of the beams 36, 38 have rotated upward as the closure member 24 has rotated upward.

The relative rotation between the closure member 24 and the beams 36, 38 is a function of many variables, among which are the length of each beam and the distance from the upper end of each beam to the pivot 28. By manipulating these variables, the magnitude and direction of the biasing force applied to the closure member 24 by the spring 30 at various points in the rotation of the closure member can be adjusted to thereby adjust the torque applied to the closure member.

Another reason the torque applied to the closure member 24 decreases as it rotates upward is that the biasing force exerted by the spring 30 on the closure member decreases somewhat as the upper ends of the beams 36, 38 spread apart. This is due to the characteristic of the spring 30 known to those skilled in the art as a spring rate (load/deflection). Various techniques may be used to maintain a sufficiently large biasing force to effectively and reliably rotate the closure member 24 upward, and some of these techniques are discussed below.

The length, thickness, width and material of which the beams 36, 38 are made will affect the spring rate and, thus, the biasing force and torque applied to the closure member 24. It is not necessary for the beams 36, 38 to have constant thickness, width or material properties since, for example, it may be most efficient to provide greater material strength and elasticity and/or greater material volume and/or greater moment of inertia in portions of the beams subjected to greater stress.

Note that each of the beams 36, 38 is thicker at its lower end since, in this example, the lower ends of the beams are subjected to greater bending stress than the upper ends of the beams. In addition, the spring 30 is preferably integrally formed of a single piece of material. The spring 30 could be formed, for example, using EDM manufacturing techniques. Alternatively, the spring 30 could be formed from multiple pieces of material, with the lower ends of the beams 36, 38 joined using any technique (such as welding, clamping, bonding, wire wrapping, composite wrapping, fastening with rivets, screws, bolts, pins, etc.).

Figure 4:
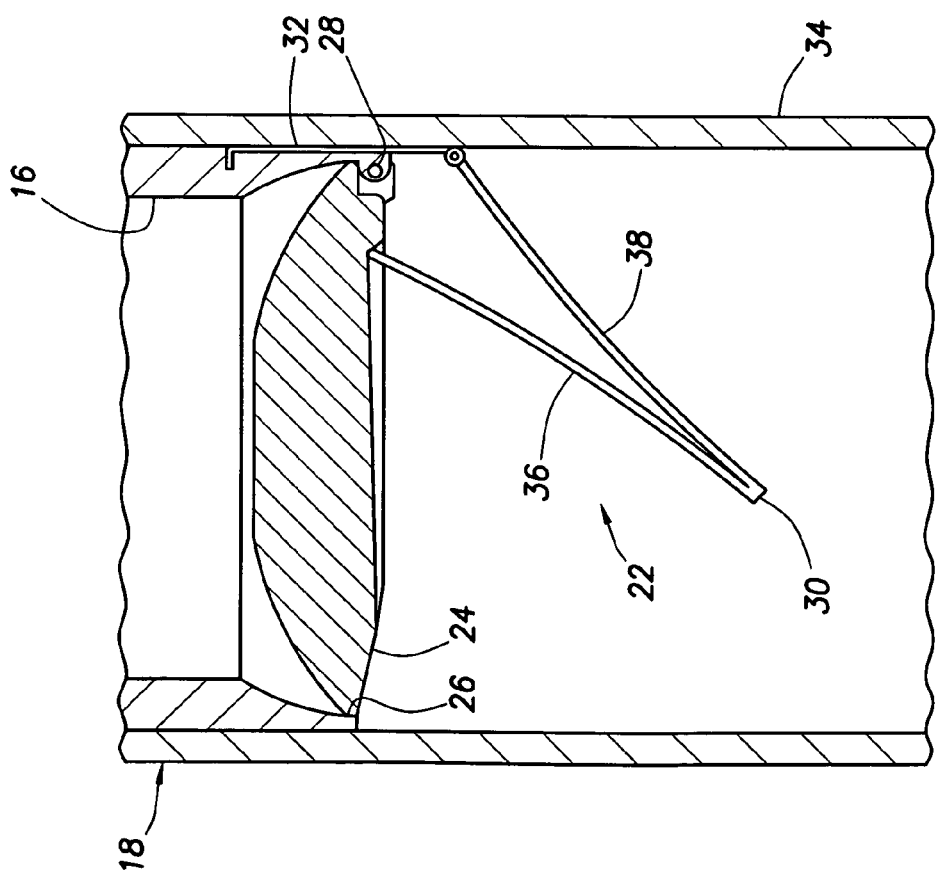
FIG. 4 is a cross-sectional view of the portion of the safety valve of FIG. 2, wherein the closure mechanism is depicted in a fully closed configuration.

Referring additionally now to FIG. 4, the closure mechanism 22 is representatively illustrated with the closure member 24 rotated upward sufficiently far to sealingly engage the seat 26. In this configuration, flow through the passage 16 is prevented. This is the fully closed position of the closure member 24.

The spring 30 continues to apply a biasing force to the closure member 24, since the spring remains somewhat compressed. Note that the spring 30 has rotated further upward as compared to the configuration depicted in FIG. 3.

Figure 5:
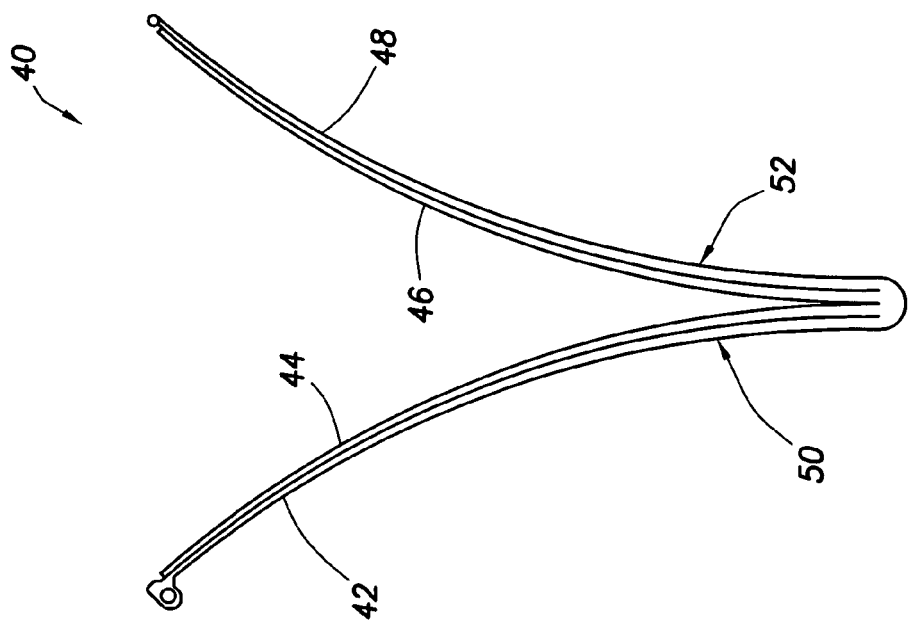
FIG. 5 is an enlarged scale elevational view of a first alternate configuration of a spring for use in the closure mechanism.

Referring additionally now to FIG. 5, an alternate construction of a spring 40 which may be used in place of the spring 30 in the closure mechanism 22 is representatively illustrated. The spring 40 is shown in an uncompressed state.

The spring 40 is similar in some respects to the spring 30. The spring 40 is formed of a single piece of material, and it has two legs 50, 52 which curve outward from each other toward their upper ends. However, it should be clearly understood that the spring 40 could be formed of multiple pieces of material and could be otherwise configured, in keeping with the principles of the invention.

One difference between the springs 30, 40 is that the spring 40 includes multiple beams 42, 44, 46, 48 in each of its legs 50, 52. It will be appreciated by those skilled in the art that the use of multiple beams (instead of a single beam having an equivalent width, thickness and length) in each of the legs 50, 52 reduces the bending stresses in the beams for the same amount of deflection, at least in part due to the fact that shear stress is not transferred between the multiple beams. Stated differently, for a given level of bending stress, greater deflection is obtained by using multiple beams as compared to using a single beam of equivalent width, thickness and length.

Each of the beams 42, 44, 46, 48 of the spring 40 has a progressively reduced thickness from its lower end to its upper end, similar to the beams 36, 38 of the spring 30. As with the spring 30, the spring 40 may have beams which vary in thickness, width, length, material type, etc. as desired to produce appropriate biasing forces, stresses and deflections when used in the closure mechanism 22.

Figure 6:
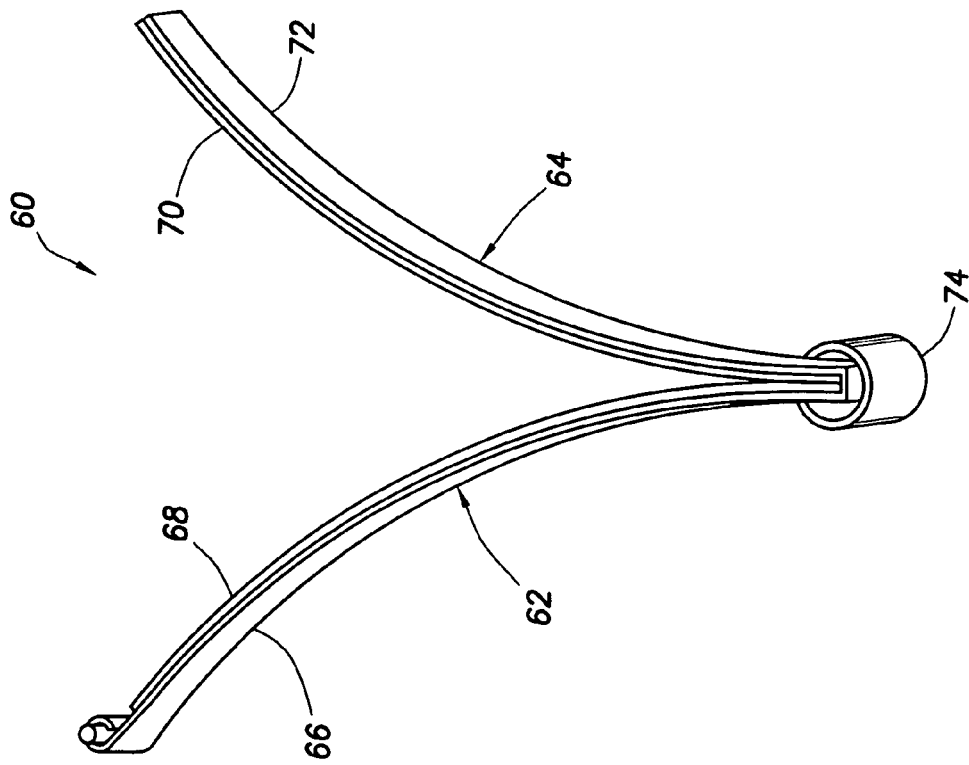
FIG. 6 is an isometric view of a second alternate configuration of the spring.

Referring additionally now to FIG. 6, another spring 60 which may be used in place of the spring 30 in the closure mechanism 22 is representatively illustrated. The spring 60 is shown in an uncompressed state.

The spring 60 is similar in some respects to the spring 40 described above. Most noticeable are the two legs 62, 64. The leg 62 includes multiple beams 66, 68, and the leg 64 includes multiple beams 70, 72.

However, each of the beams 66, 68, 70, 72 is formed from a separate piece of material, instead of all of the beams being formed from a single piece of material as in the springs 30, 40. The beams 66, 68, 70, 72 are joined to each other at their lower ends by a tubular clamp 74, but any other joining technique (e.g., welding, bonding, fastening, wrapping, etc.) could be used if desired.

This configuration of the spring 60 enables the beams 66, 68, 70, 72 to be formed from materials which might not be usable in the configurations of the springs 30, 40. For example, spring steel having a relatively high yield strength, and which might not be easily formed using the techniques used to form the springs 30, 40, could be used for the beams 66, 68, 70, 72 in the spring 60.

Although the beams 66, 68, 70, 72 are depicted in FIG. 6 as having constant thickness, their thicknesses could vary in the same manner as that of the beams 36, 38, 42, 44, 46, 48 described above. Alternatively, the widths of the beams could decrease progressively from the lower ends to the upper ends of the beams 66, 68, 70, 72.

Figure 7:
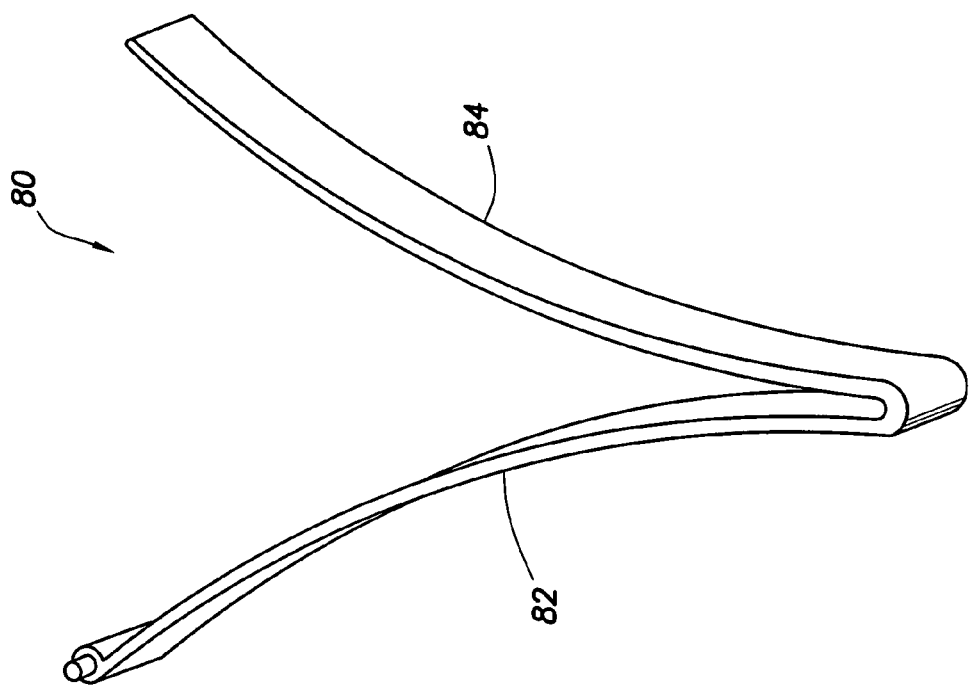
FIG. 7 is an isometric view of a third alternate configuration of the spring.

Referring additionally now to FIG. 7, another spring 80 which may be used in place of the spring 30 in the closure mechanism 22 is representatively illustrated. The spring 80 is shown in an uncompressed state.

The spring 80 is similar to the spring 30, in that it has only two beams 82, 84, and the spring is formed from a single piece of material. In addition, a thickness of each of the beams 82, 84 decreases progressively from the lower end to the upper end.

However, the spring 80 is preferably formed from a very high strength composite material. For example, a carbon/PEEK composite material may have a tensile strength of 300,000 psi and a modulus of elasticity of 18-20 million psi. Alternative materials include non-composite materials, such as titanium alloys, etc.

As with the other springs 30, 40, 60 described above, the spring 80 may have beams which vary in thickness, width, length, material type, etc. as desired to produce appropriate biasing forces, stresses and deflections when used in the closure mechanism 22.

Note that any of the features of the springs 30, 40, 60, 80 may be combined with the features of any of the other springs described above. For example, a composite material could be used in the beams 66, 68, 70, 72 of the spring 60, a spring steel material could be used in the spring 80, the spring 60 could have a single beam in each of its legs 62, 64, the spring 80 could have multiple beams in each of its legs, the clamp 74 could be used to join the beams 82, 84 in the spring 80, etc.

The springs may also include features which function to increase a displacement/stress ratio for each spring, increase the force generated, increase the torque applied at certain positions of the closure member 24, etc. A few such features are described below, but it should be clearly understood that a wide variety of other features, and any combination of features, may be included in a spring in the closure mechanism 22 in keeping with the principles of the invention.

Figure 8:
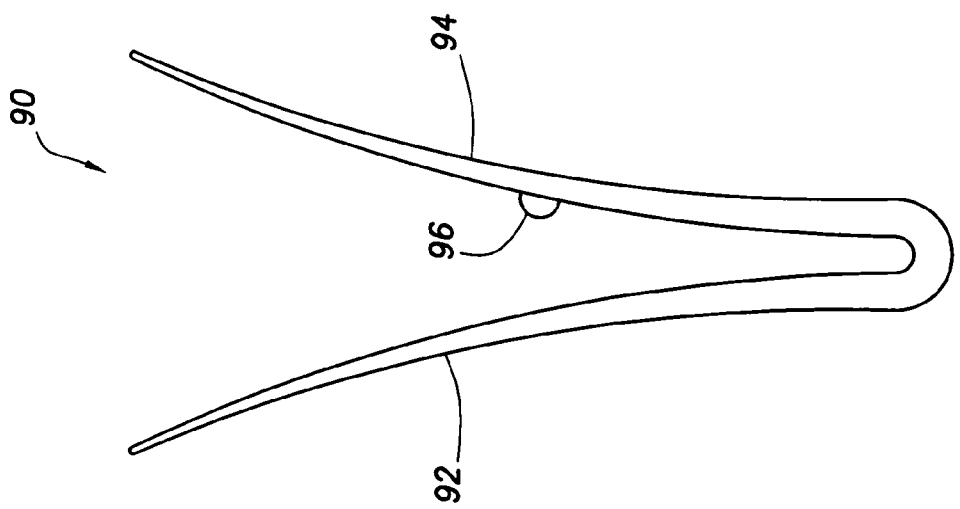
FIG. 8 is an elevational view of a fourth alternate configuration of the spring.

Referring additionally now to FIG. 8, another spring 90 is representatively illustrated. The spring 90 includes a feature which increases the spring rate of the spring as the spring is compressed.

Specifically, the spring 90 includes two beams 92, 94 and a fulcrum 96 positioned between the upper and lower ends of the beams. When initially compressed from the configuration depicted in FIG. 8, the spring 90 has a corresponding initial spring rate which is determined by the overall lengths, widths, thicknesses, material types, etc. of the beams 92, 94.

However, when the beams 92, 94 are compressed sufficiently far for the fulcrum 96 to contact the inner surface of the beam 92, the spring rate of the spring 90 increases substantially with further compression of the spring. One beneficial effect of this increased spring rate when the spring 90 is used in the closure mechanism 22 is that an increased biasing force can be applied to the closure member 24 when it is needed to initiate rotation of the closure member.

Although the fulcrum 96 is depicted as being attached to the beam 94, it will be readily appreciated that it could be integrally formed with either of the beams 92, 94, or it could be attached to neither of the beams, if desired. In addition, any other technique of increasing the spring rate of the spring 90 as it is compressed could be used in keeping with the principles of the invention.

Figure 9:
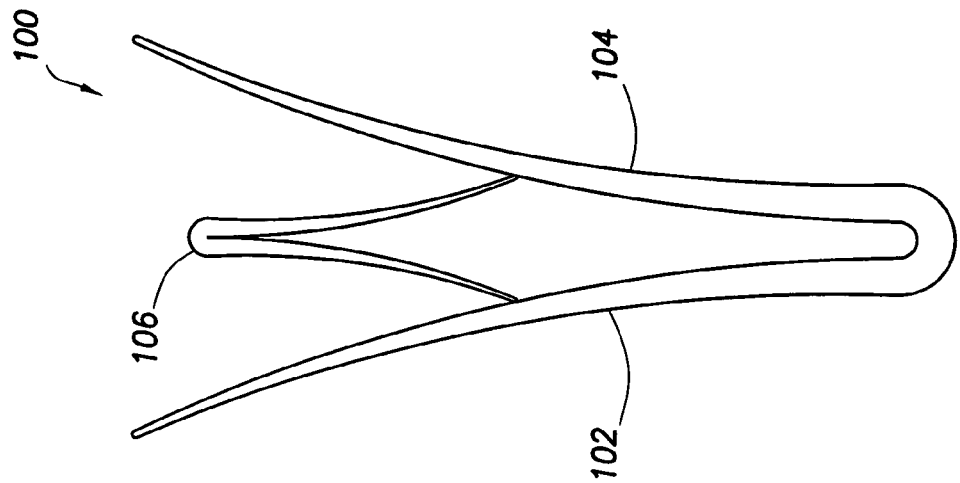
FIG. 9 is an elevational view of a fifth alternate configuration of the spring.

Referring additionally now to FIG. 9, another spring 100 is representatively illustrated. The spring 100 includes features which increase the biasing force exerted when the spring is compressed.

The springs 30, 40, 60, 80, 90 may be considered "mono" springs, in that only a single such spring may be used in the closure mechanism 22. However, the spring 100 includes beams 102, 104 similar to the beams 92, 94 of the spring 90, as well as an additional spring 106 positioned between the beams 102, 104.

The spring 106 is compressed when the beams 102, 104 are deflected toward each other, thereby increasing the biasing force exerted by the spring 100. Although the spring 106 is depicted as being similar in configuration to the springs 30, 90 described above (but smaller in scale), any other type of spring may be used instead of, or in addition to, the illustrated spring 106. For example, torsion springs, spiral wound springs, leaf springs, etc. could be used.

It may now be fully appreciated that the present invention provides significant advantages in the art of safety valve design. Safety valves can now have greater inner diameter/outer diameter ratios (i.e., thinner sidewalls), and closure mechanisms in safety valves can be less expensive, more reliable, have fewer elements and less mass, etc.

One benefit provided by certain embodiments of the invention is the elimination of spiral wound springs. Torsion springs and coiled springs are examples of spiral wound springs. It has been found that such spiral wound springs are relatively inefficient in terms of space/torque output ratios.

Spiral wound springs are preferably eliminated in safety valves constructed according to the principles of the invention, but in appropriate circumstances (such as in the example depicted in FIG. 9) a spiral wound spring could be included in a safety valve without departing from the principles of the invention.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A safety valve for use in a subterranean well, the safety valve comprising:
 a closure mechanism including a spring, the spring including at least one leg which has a progressively reduced cross-sectional area along a majority of its length.

2. The safety valve of claim 1, wherein the closure mechanism includes multiple biasing members.

3. The safety valve of claim 1, wherein the closure mechanism includes a closure member having a fully closed position in which flow through a passage of the safety valve is prevented, and a fully open position in which maximum flow through the passage is permitted, the closure member being biased by the spring to pivot from the fully open position to the fully closed position, and wherein the entire spring rotates as the closure member rotates.

4. The safety valve of claim 1, wherein the spring is formed from a single piece of material.

5. The safety valve of claim 1, wherein the spring is formed from multiple pieces of material joined to each other.

6. The safety valve of claim 1, wherein the spring includes at least two legs, the legs being joined to each other at an end of each leg.

7. The safety valve of claim 6, wherein at least one of the legs includes multiple beams.

8. The safety valve of claim 6, wherein a biasing member extends between two of the legs.

9. A safety valve for use in a subterranean well, the safety valve comprising:
 a closure mechanism including a spring having a leg which bends along its length to bias a closure member toward a fully closed position in which flow through a passage of the safety valve is prevented, the leg applying a biasing force to the closure member at the fully closed position and at a fully open position of the closure member in which maximum flow through the passage is permitted, and wherein the entire spring rotates as the closure member rotates.

10. The safety valve of claim 9, wherein the leg has a progressively reduced cross-sectional area along a majority of its length.

11. The safety valve of claim 9, wherein the closure mechanism includes multiple biasing members.

12. The safety valve of claim 9, wherein the spring is formed from a single piece of material.

13. The safety valve of claim 9, wherein the spring is formed from multiple pieces of material joined to each other.

14. The safety valve of claim 9, wherein the spring has at least two legs, the legs being joined to each other at an end of each leg.

15. The safety valve of claim 9, wherein the leg includes multiple beams.

16. A safety valve for use in a subterranean well, the safety valve comprising:
 a closure mechanism including a closure member, and a spring with at least one leg which applies a biasing force to the closure member, the leg comprising multiple overlapping beams, wherein the entire spring rotates as the closure member rotates.

17. The safety valve of claim 16, wherein the leg has a progressively reduced cross-sectional area along a majority of its length.

18. The safety valve of claim 16, wherein the closure mechanism further includes at least one biasing member which cooperates with the spring to apply the biasing force to the closure member.

19. The safety valve of claim 16, wherein the spring is formed from a single piece of material.

20. The safety valve of claim 16, wherein the spring includes multiple materials.

21. The safety valve of claim 16, wherein the beam includes a fulcrum.

22. A safety valve for use in a subterranean well, the safety valve comprising:
 a closure mechanism including a closure member, and a spring with at least one leg which applies a biasing force to the closure member, wherein the leg comprises multiple overlapping beams, and wherein the spring is formed from multiple pieces of material joined to each other.

* * * * *